Dec. 17, 1935.    R. G. ROBERTS    2,024,602
PROTECTION OF PIPE JOINTS
Filed April 22, 1933    2 Sheets-Sheet 1
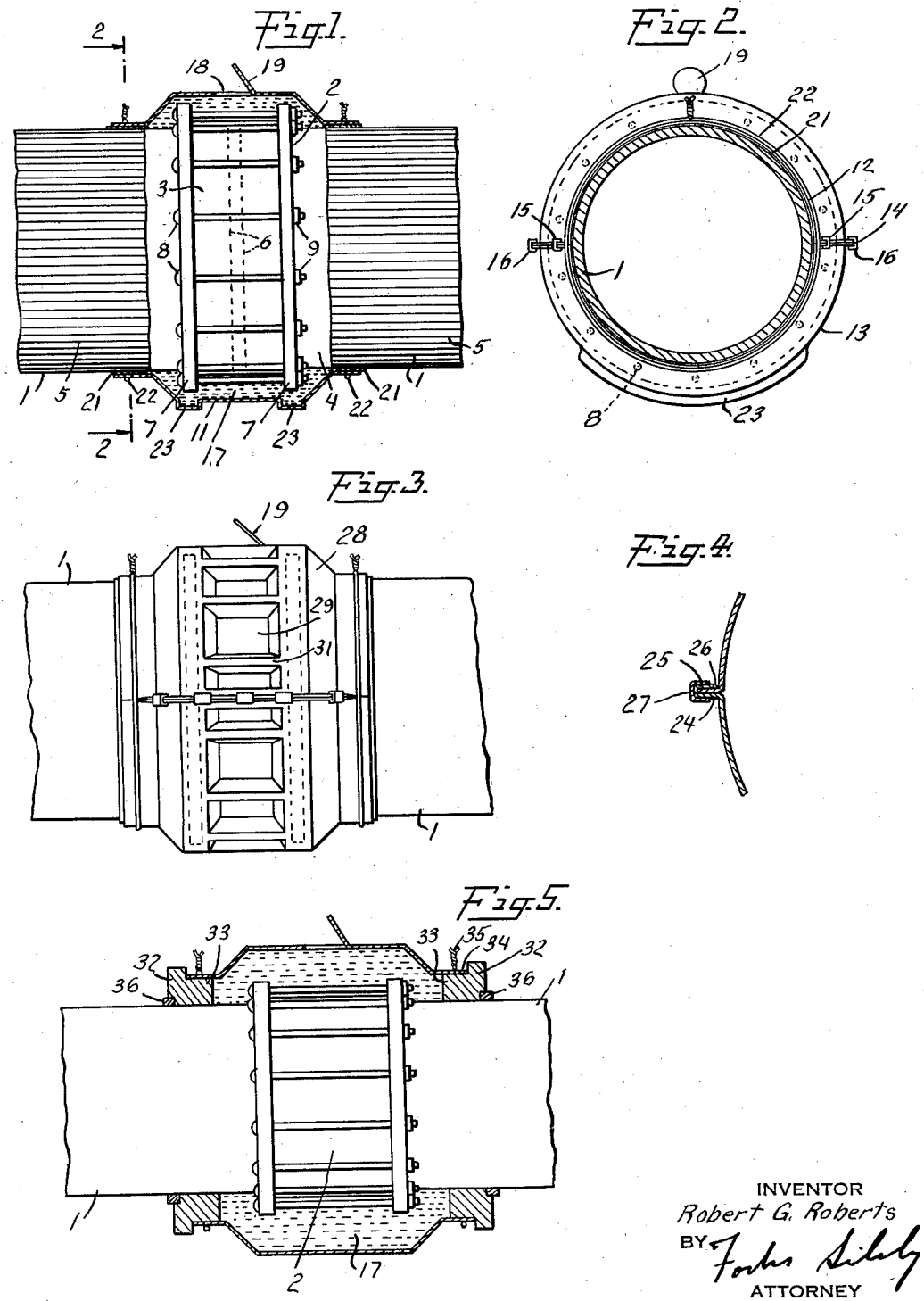
INVENTOR
Robert G. Roberts
BY
ATTORNEY

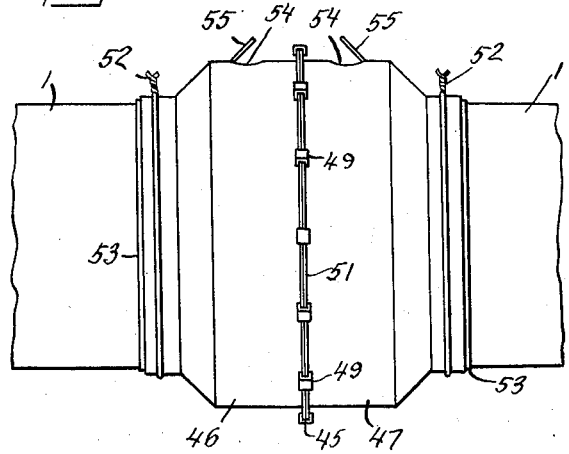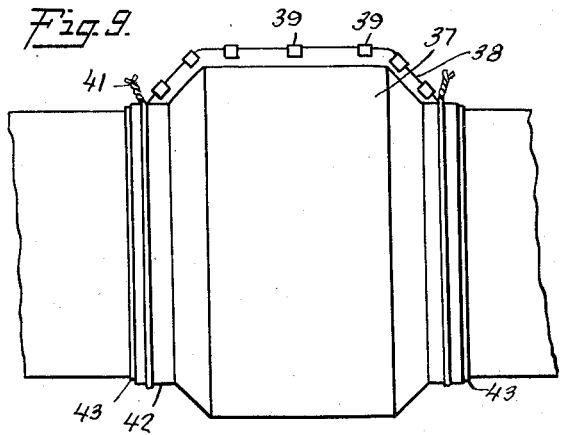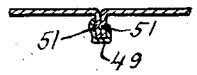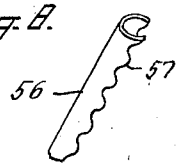

Patented Dec. 17, 1935

2,024,602

UNITED STATES PATENT OFFICE 2,024,602

PROTECTION OF PIPE JOINTS

Robert Gregory Roberts, Kansas City, Mo., assignor to The Barrett Company, New York, N. Y., a corporation of New Jersey Application April 22, 1933, Serial No. 667,335

7 Claims. (Cl. 285—98)

This invention relates to the protection of pipe lines against deterioration, and more particularly, to a method and apparatus for protecting joints of pipe lines buried in the ground against the destructive chemical action of the soil and soil water by protecting the chemically inert coating materials ordinarily used for covering pipe joints against erosive, puncture and shearing effects of soil movement.

In the development of long-distance transmission of oil and gas through pipe lines, it has been found necessary to protect the steel pipes ordinarily used against the severe corrosive and chemically destructive action of soils and of water and other agents contained in the soil through which such pipe lines pass. Such destructive conditions are particularly severe where stray electric currents are found or where electric potential differences exist on, and in the neighborhood of, such pipe lines. The investment in such pipe lines is large, and without some means of protection against loss by corrosion and deterioration, replacement costs would be excessive.

It has, therefore, become standard practice in laying such pipe lines to coat the pipes with various types of chemically inert coating materials, especially bituminous paints and enamels.

Coatings of this type are frequently applied in a molten condition to a rotating section of the pipe, the coating cooling to a hard, tough film immediately after application. Such bituminous coatings are usually of a relatively high melting point, for example 145° F. or upwards, and when cold, present a hard and tough surface to the soil in which the pipe is buried. A particularly desirable coating material of this kind is the mica pitch compound disclosed in Eckert Patent No. 1,773,131, issued August 19, 1930.

It is customary to coat pipe with such compound in the field at the side of the ditch in which it is to be laid, rotating the pipe sections on so-called "rolling-rigs" of well-known design. This method of application limits the length of section that can be rotated in such apparatus, depending upon the diameter of the pipe. For example, it is ordinary practice to weld together three sections, each twenty feet long, of, for example, 24-inch diameter pipe, and coat the resulting section, sixty feet in length, on a rolling-rig in one operation.

These sections of pipe when coated with protective enamel may be coupled together with some type of expansion joint or coupling and lowered into the ditch. The expansion couplings allow a certain freedom of movement, permitting the pipe to expand and contract with changes in temperature without buckling or leaking. Expansion couplings may consist of sleeves sufficiently large to slip over the pipe, and placed so as to span the joints between adjacent pipe sections, together with follower or compression rings, which are drawn by means of bolts against rubber or composition gaskets, thus closing the joints between the sleeves and the pipe line. This arrangement makes a tight joint which, at the same time, permits a certain amount of relative movement between the component parts. A well-known coupling of this type is the "dresser coupling", shown diagrammatically in Fig. 1 of the drawings.

Because of the sliding of its component parts on the pipe forming the pipe line in assembling the coupling and because the ends of the pipe sections rest on rollers of the rolling-rig during coating, it is customary, in coating the pipes with the protective compositions described above, to leave a portion at the end of each section bare of enamel, for example, about 10 or 12 inches.

After assembly of the couplings on the pipe sections which it joins, it is necessary to coat the uncoated ends of the pipe section and the exposed parts of the coupling with a protective enamel or paint. This may also be a bituminous material with a mineral filler, such as mica. It has been found necessary, and is common practice, to use a much softer, more fluid and ductile coating for this purpose than is used to cover the main body of the pipe. This is made necessary by two factors; namely, (1) the enamel or paint applied at the coupling must be sufficiently tenacious and at the same time ductile not to crack or separate when the separate parts of the joint move relatively to each other owing to expansion and contraction caused by the changes described above, or caused by stresses set up in lowering the pipe into position or by soil movement after the pipe has been laid; and (2) the somewhat complex shape of the coupling—its recesses and protuberances—make it necessary to use a fluid enamel and one that does not set too rapidly in order to ensure that all parts of the coupling and adjacent pipe surfaces be effectively coated with the protective material. The use of a material which meets these conditions, however, has one grave disadvantage; namely, that such a material is not sufficiently resistant to the shearing and erosive action of the soil, both during the filling-in operation after the pipe has been laid and subsequently. Such soil movements frequently rub or shear away the softer coupling enamel completely from the metal surfaces which it covers and subject such exposed surfaces to the destructive conditions to which pipe lines are subjected. Hence, the joints or couplings are the weakest points in the pipe line and are usually the first to fail. It has been recognized as highly desirable to develop an effective protection against this action, but so far as I am aware, no satisfactory and practical method or device has been developed to meet this situation.

It has been proposed to apply jointed, removable metal housings to pipe couplings during the coating of such couplings as a means of keeping the coating material in place until it has hardened, and then remove the housing. Such a procedure involves the use of cumbersome and complicated equipment and affords no protection of the coating after the pipe has been buried.

According to my invention, I coat expansion couplings or similar joints, together with the adjacent uncoated portions of the pipe line, with coupling enamel, but I apply the enamel in a more effective way than has been customary and protect it with a rigid, resistant, relatively light, non-corrosive shield strong enough to resist the movements of the adjacent soil which would otherwise tend to remove the enamel from the metal surfaces. In my method of protection, I also apply a layer of enamel that is much thicker than that usually applied, and this thick layer of enamel is held in place by my coupling shield. Preferably, the shield should be waterproof and non-conductive of electricity.

In protecting couplings as described above, I prefer to use a shield that conforms more or less to the shape of the coupling in order to minimize the amount of compound necessary for each coupling, while at the same time leaving room for a reasonably thick enamel layer at every point. For ease of application, I find it desirable to use a coupling made in two or more parts with longitudinal joint or joints, but a shield with circumferential joints may be used if desired. The type of shield having longitudinal joint or joints may be applied after the coupling and pipe have been assembled, whereas the type with circumferential joint must be assembled with the couplings.

According to my invention, the shield and coupling are assembled with the pipe before applying the coupling compound, care being taken that all unenamelled and unprotected surfaces are exposed within the shield. I prefer to use a shield having an opening at the top when assembled, but otherwise tightly closed. When the coupling, pipe and shield have been assembled, I pour molten coupling compound in the opening at the top of the shield until the spaces between the shield and coupling and between the shield and pipe become entirely filled with the compound.

In this operation, I take care to pour in the compound slowly enough to permit the driving out of air as effectively as possible from the crevices and recesses of the joint.

The shields or housings or my invention may be made of any reasonably rigid, tough, non-corrosive, waterproof material. I prefer to use a non-metallic material, such as felt saturated with hard pitch or asphalt or with a synthetic resin, e. g., paracoumarone resin, phenol-formaldehyde resin, or the like, or mixtures of resins, and moulded to the desired shape. Such shields are light, elastic, sufficiently rigid, and cheap. Metal shields, preferably of metal non-corrosive under the conditions of use, may be employed.

For most purposes, I prefer a shield made in two or more sections adapted to be assembled on the pipe. I may, however, especially for covering the smaller sizes of pipe, use a shield made in one piece with a single longitudinal joint, the shield being sprung open or unfolded at this joint to apply it to the pipe. The opened shield is drawn tight around the coupling and secured in place, the joint occurring preferably at the top.

In the accompanying drawings—

Fig. 1 is a side view, partly in section, and illustrates a coupling protected in accordance with this invention;

Fig. 2 is a section through Fig. 1 taken in a plane passing through line 2—2 of Fig. 1;

Fig. 3 shows a side view of a shield of a modified design;

Fig. 4 is a detail of a form of longitudinal joint for the housing protecting the coupling;

Fig. 5 is a vertical section, partly in elevation, through a pipe joint, embodying the protecting housing of this invention, equipped with adapters permitting use of one and the same size housing with different sizes of pipes;

Fig. 6 shows a side elevation of a modified form of housing having a circumferential joint;

Fig. 7 is a vertical sectional detail through the joint of Fig. 6;

Fig. 8 illustrates one type of fastener for securing the joints of the housing; and Fig. 9 is a side elevation of a one-piece housing having a longitudinal joint.

In the drawings, I represents pipe sections coupled by an expansion coupling 2, the sleeve 3 of which is of sufficient diameter to slide over the uncoated end portions 4 of the pipes I. The coating on the pipes is indicated by the reference numeral 5. The sleeve 3 of the coupling spans the joint indicated by the dotted lines 6. Follower or compression rings 7, drawn together by bolts 8 and nuts 9, are disposed on opposite sides of sleeve 3. Gaskets (not shown) underlie the compression rings 7 and by tightening the nuts 9 on the bolts 8, passing through the rings 7, the gaskets, in well-known manner, are brought home against the ends of sleeve 3 and adjacent pipe walls, forming a tight joint with the underlying pipe surface.

A housing 11, which may be of felt saturated with hard pitch or other suitable material, surrounds the coupling 2. This housing, in the embodiment of the invention shown on Figs. 1 and 2, is formed of two sections, the upper section being indicated by the reference numeral 12 and the lower section by the reference numeral 13, the two sections being joined longitudinally of the pipe, as indicated at 14 (Fig. 2). The joint between the upper and lower sections of the housing is formed by clips 15 securely engaging and holding together the abutting portions of the housing, there being a series of these clips longitudinally along the joint. The clip indicated by the reference numeral 16 on Fig. 2 identifies a clip occurring at the large diameter portion of the housing, which, as appears from Fig. 1, is provided to accommodate the follower rings 7.

The housing is filled with soft pitch or coupling compound 17, which may be introduced in molten form through the fill-hole 18 in the upper section 12 of the housing. A cover or cap 19 is provided to close the fill-hole or port 18. Relatively soft packing rings 21 are disposed at the ends of the housing. Bands or wires 22 surround the ends of the housing and are utilized to form a pitch-tight joint between the ends of the housing and the underlying pipe surface. If desired, the housing may be formed with reenforcing ribs 23 formed integral with or secured to the lower section 13 to give added strength thereto.

In lieu of the construction of Fig. 2, in which clamps 15 are utilized to secure abutting portions of the joint of the housing one of the flanges 24 of the joint where the two portions of the housing meet may be trough-shaped as indicated by the reference numeral 25 (Fig. 4). The trough-shaped flange 25 is adapted to engage the flat flange 26 of the upper section of the housing. A relatively soft iron clip 27 may be employed, being compressed over and around the flanges to form a suitably tight joint. Housing with longitudinal joints such as shown in Figs. 1 and 2, instead of being made in two sections, may be made in three or any desired number of substantially like or unlike sections. While absolutely tight joints may be desirable under some circumstances, they are not necessary. It is desirable to have the joints sufficiently tight to retain the molten protective coating during its introduction into the housing and subsequent hardening or setting.

An economy in the amount of compound required to fill the housing may be effected by making the housing in the form shown in Fig. 3. In this embodiment of the invention, the contour of the housing 28 follows more or less the contour of the coupling. Depressions 29 are formed in the housing, set off by reenforcing ribs 31. Thus the effective capacity of the housing is reduced by the volume of the depressions 29.

In order that one size of housing be made to serve for pipes of various size, adapters 32 (Fig. 5) of predetermined sizes, depending upon the size of pipe, may be placed on the pipe sections 1. The end portions 33 of the adapters extend within the ends 34 of the housing and a tight joint between the adapter and the housing is secured by means of wires or clamps 35. The adapters are advantageously in the form of rings of pitch- or resin-saturated, molded felt, fitting closely to, but slidable on, the pipe sections 1. They may be made of one or a plurality of pieces. The joints between the adapters and the pipe sections may be made pitch-tight by caulking, as indicated at 36, with a plastic caulking compound.

A one-piece housing may have the form shown in Fig. 9 in which the reference numeral 37 indicates the housing proper and the joint where the ends of the housing meet is indicated by the reference numeral 38. As in the case of Fig. 2, this joint is formed by clamps 39 passing over the abutting portions of the housing. The ends of the housing make a tight joint with the pipe sections by means of wire or clamps 41 which secure the end portions 42 of the housing onto the underlying packing rings 43. In the application of the form of housing shown in Fig. 9 to the coupling, the housing is first placed about the coupling, the ends secured by wire or clamps 41, coupling compound introduced through a spread-apart portion of the joint 38 and the joint then completely closed by means of clamps 39. Alternatively, a separate fill-hole may be provided as shown in Fig. 1.

Fig. 6 illustrates a housing having a circumferential joint 45 uniting the sections 46 and 47 of the housing. This joint may be formed, as shown in Fig. 7, by means of clamps or clips 49 uniting the flanges 51 of the sections 46 and 47. Clamp 49 may be of soft iron since its destruction in time by corrosion will not destroy the effectiveness of the housing which will be held in place by the solidified pitch or protective compound contained in the housing. As in the case of the other housings, the ends of the housing of Fig. 6 are held to the pipe sections by bands or clips 52, gaskets 53 being inserted between the ends of the housing and the pipe to insure a satisfactory joint. Each of the sections 46 and 47 of the housing of Fig. 6 is provided with a fill-hole 54 adapted to be closed by a cap or plate 55.

In lieu of separate clamps, such as 49 of Fig. 6, clamps 56 in the form of strips, as shown in Fig. 8, having prongs 57 for engagement with the flanges of the coupling, may be utilized. Clamps of both types may be applied with a suitable compression tool.

In installing a housing with longitudinal joint, the coupling is first assembled in the usual way. The two halves of the housing are placed in position and secured by tightening the wires or bands 22. Clamps 15 are then applied. All joints in the housing may, if desired, be coated before assembly with a suitable plastic, e. g., a rubber or cellulose-ester compound or the like, to make a pitch-tight joint. When the housing is completely assembled, molten coupler compound, such as pitch of a melting point of about 140 to 145° F. is poured in at holes 18 at a temperature of about 300 to 400° F. until the housing is filled. Flap 19 is then pressed down. The pitch or other compound should be sufficiently fluid, have sufficient wetting power, and be poured sufficiently slowly to reach all the exposed surfaces within the housing and displace substantially all air from the surfaces. The pipe is then lowered into its ditch.

The procedure with housings having a circumferential joint is similar except, however, that the two halves must be placed in position on the pipe sections before the coupling parts are placed on the sections. After the coupling is drawn up, the halves 46 and 47 are brought together and clamped, the bands 52 tightened, and the housing filled as before.

My invention thus provides a dependable, economical, and readily used method and apparatus for protecting pipe joints and couplings from erosion and corrosion when buried in the earth. It may also be advantageously employed on pipes exposed to severe atmospheric conditions or submerged in water.

The foregoing description is to be taken as illustrative of, rather than limiting, my invention.

I claim:

1. An underground pipe line comprising sections of pipe joined by couplings permitting expansion and contraction of pipe sections, each pipe section being coated with protective material except the end portions thereof contiguous to the couplings, a bitumen saturated fibrous material housing surrounding each coupling and the uncoated end portions of the pipe sections contiguous thereto and protective material in said saturated fibrous material housing covering the uncoated pipe sections and the coupler, said protective material being sufficiently tenacious and ductile not to crack and separate when the coupled pipe sections move relatively to each other due to temperature changes to which the pipe line is subjected.

2. An underground pipe line comprising sections of pipe joined by couplings permitting expansion and contraction of pipe sections, each pipe section being coated with bituminous material except the end portions thereof contiguous to the couplings, a saturated fibrous material housing surrounding each coupling and the uncoated end portions of the pipe sections contiguous thereto and bituminous material in said saturated fibrous material housing covering the uncoated pipe sections and the coupler, said bituminous material being sufficiently tenacious and ductile not to crack and separate when the coupled pipe sections move relative to each other due to temperature changes to which the pipe line is subjected.

3. A preformed coupler housing of substantially waterproof saturated fibrous material adapted to be permanently mounted around a pipe coupling and retain molten protective compound during its application and until hardened.

4. Means for protecting an underground pipe line fitting against the destructive agencies of the soil comprising a housing constituted of electrically non-conducting, chemically inert, waterproof material resistant to the corrosive and other destructive influences of the soil, said housing being adapted to be permanently mounted about a pipe line fitting to provide a substantial space between the fitting and the interior walls of the housing for the reception and retention of protective material.

5. An underground pipe line assembly comprising pipe sections and a fitting, a housing constituted of fibrous material impregnated with a coal-tar product surrounding said fitting and the contiguous portions of the pipe, said housing containing protective material sufficiently soft and ductile to provide uninterrupted protection irrespective of relative movement of the pipe sections due to temperature changes.

6. A housing for the protection of an underground pipe line fitting, said housing comprising a plurality of segments of electrically non-conductive, chemically inert material resistant to the corrosive and abrasive influences of the soil and a plurality of end members, said segments and end members cooperating to form an enclosure for receiving and retaining protective material about the pipe line fitting and protecting the latter against the corrosive and abrasive influences of the soil.

7. An underground pipe line assembly comprising pipe sections and a fitting, a housing constituted of fibrous material impregnated with water repellant material surrounding said fitting and the contiguous portions of the pipe, said housing containing protective material sufficiently soft and ductile to provide protection for the pipe fitting irrespective of relative movement of the pipe sections due to temperature changes.

ROBERT GREGORY ROBERTS.